(12) United States Patent
Postal et al.

(10) Patent No.: US 9,417,836 B2
(45) Date of Patent: Aug. 16, 2016

(54) METHOD AND SYSTEM FOR MANAGING THE INTERACTION OF MULTIPLE DISPLAYS

(71) Applicant: SAMSUNG ELETRÔNICA DA AMAZÔNIA LTDA., Manaus-Am (BR)

(72) Inventors: Antonio Henrique Barbosa Postal, Campinas (BR); Fabio Roberto Porto Silva, Campinas (BR)

(73) Assignee: SAMSUNG ELETRÔNICA DA AMAZÔNIA LTDA., Campinas-Sâo Paulo (BR)

( * ) Notice: Subject to any disclaimer, the term of this patent is extended or adjusted under 35 U.S.C. 154(b) by 303 days.

(21) Appl. No.: 14/068,711

(22) Filed: Oct. 31, 2013

(65) Prior Publication Data
US 2014/0359492 A1 Dec. 4, 2014

(30) Foreign Application Priority Data
Jun. 3, 2013 (BR) .......................... 1020130136972

(51) Int. Cl.
*G06F 3/0484* (2013.01)
*G06F 3/14* (2006.01)

(52) U.S. Cl.
CPC ............ *G06F 3/1446* (2013.01); *G06F 3/1438* (2013.01); *G09G 2340/0492* (2013.01); *G09G 2340/145* (2013.01)

(58) Field of Classification Search
CPC ............................ G06F 3/1446; G06F 3/0484
See application file for complete search history.

(56) References Cited

U.S. PATENT DOCUMENTS

| | | | | |
|---|---|---|---|---|
| 2008/0061578 A1* | 3/2008 | Igoe | .................... | H04L 12/2809 296/68.1 |
| 2008/0062625 A1* | 3/2008 | Batio | .................... | G06F 1/1615 361/679.29 |
| 2009/0102744 A1* | 4/2009 | Ram | .................... | G06F 1/1601 345/1.1 |
| 2010/0007603 A1* | 1/2010 | Kirkup | .................. | G06F 1/1616 345/158 |
| 2010/0162128 A1* | 6/2010 | Richardson | ........... | G06F 1/1624 715/744 |
| 2012/0081312 A1* | 4/2012 | Sirpal | .................. | G06F 1/1616 345/173 |
| 2012/0280898 A1* | 11/2012 | Lucero | .................. | G06F 3/1446 345/156 |
| 2013/0275642 A1* | 10/2013 | Teltz | .................... | G06F 1/1632 710/303 |
| 2014/0132833 A1* | 5/2014 | Wang | .................... | H04N 5/268 348/383 |

* cited by examiner

*Primary Examiner* — Anil Bhargava
(74) *Attorney, Agent, or Firm* — Staas & Halsey LLP

(57) ABSTRACT

A method for managing the interaction of mobile systems based on a system having at least two touch screens and side sensors. Such interaction is promoted by contact of the sides of the device, whose goal is to provide the user with the option to expand the original display area, including different views of the image in different alignments and orientations.

10 Claims, 4 Drawing Sheets

FIG. 2

METHOD AND SYSTEM FOR MANAGING THE INTERACTION OF MULTIPLE DISPLAYS

CROSS-REFERENCE TO RELATED APPLICATIONS

This application claims the priority benefit of Brazilian Application No. 10 2013 013697 2, filed Jun. 3, 2013, in the Brazil National Institute of Industrial Property, the disclosure of which is incorporated herein by reference.

BACKGROUND

1. Field

Recently, portable electronic devices such as mobile phones, smartphones and PDAs (Personal Digital Assistants) have become increasingly technically advanced and multi-functional. Because of the convenience of these devices, the devices have become a necessity of daily life.

For some portable devices, such as smartphones, PDAs, tablets, PCs, and so on, a touch screen that is directly usable can be provided as a primary input device for users to control the functions. Users of handheld devices can slide a finger to touch the items displayed by touch screen, issue a command, and execute or control operations corresponding to the selected items. For example, users can click a button design or icon on the touch screen to activate the drawing function, or they can click on a navigation button or icon on the touch screen to activate the GPS navigation function.

There is a need to provide the user with adequate experience and increase productivity by means of larger screens within the limits of portability.

The present disclosure addresses several methods and systems that aim to increase the display area. These devices are equipped with touch screens of various types, in particular mobile devices from different manufacturers and are known in the prior art. Mobile devices with larger screens are better for watching videos, playing games, and photo manipulation application, and moreover, for increasing productivity. Larger screens with greater softkeys allow also for more accurate typing.

As the cost of LCD panels decreases, it has also become less expensive to produce mobile devices with double screens and larger.

2. Description of the Related Art

The patent document US20120081270A1 of IMERJ LLC, published on Apr. 5, 2012, presents a dual-screen device having control logic to minimize or maximize a primary screen to a secondary screen, which can be embedded and displayed in different positions.

The patent document US20100207903A1, of Samsung Electronics Co. Ltd, published on Aug. 19, 2010, shows a mobile device with a detachable sub-display unit, which are joined by magnetic contacts.

The U.S. Pat. No. 7,667,707, published on Feb. 23, 2010, presents a computer system with multiple screens comprising a central computer system, which processes desktop environments equipped with several windows to remote monitors, multiple users or a combination of both.

The U.S. Pat. No. 8,108,782, of Motorola Mobility, published on Jan. 31, 2012, presents a method to control multiple monitors and data communication between screens.

The U.S. Pat. No. 7,561,116, of Microsoft Corporation, published on Jul. 14, 2009, presents a method to expand a monitor with multiple displays in the same housing.

The U.S. Pat. No. 7,549,154 B2, of Microsoft Corporation, published on Jun. 16, 2009, presents a method to expand the data from a main computer system to devices having screens.

The patent document U.S. 2012-0242596, of Acer Corporation, published on Sep. 27, 2012, refers to methods for sharing a screen for use in a server coupled to a plurality of devices via a network, with each device including at least one touch screen.

The present disclosure differs from the prior art in the following aspects:

It enables the sharing of the screen from the extension of the same between devices completely independently;

It considers possible combinations of the four sides of the screen to other screens, on their respective sides;

It addresses all screen rotations and orientations between the landscape mode (90, 270 degrees) and portrait mode (0, 180 degrees), while determining the portion of the composite image to be displayed on each screen: top, bottom, left, right of the screen composed;

It does not limit the display areas and regions sensitive to touch and gestures, allowing a larger screen fully functional for the user input;

It extends evenly on the screen, regardless of the application (phone, tv, multimedia, web browser, email, desktop/screen "Home", etc.);

It does not merely limit that the interaction takes place between devices with screens of equal physical dimensions, proportions, or image resolutions;

It considers the use of alignment and sharing/extensions of the screen between the device completely independent of their respective screens, and It extends the contact and side electric detection, magnetic, physical, accelerometer, or near field communication (NFC), or even transfer data at high speed between devices by WiGig (Wireless Gigabit), technology for wireless data transmission capable of transmitting data up to 12 times faster than current wireless standard.

SUMMARY

Additional aspects and/or advantages will be set forth in part in the description which follows and, in part, will be apparent from the description, or may be learned by practice of the invention.

The present disclosure proposes a method to compose at least two screens, extending the same in different combinations of alignments and guidance only momentarily approaching or touching the screens side by side. The main objective is to increase the usable display area beyond the dimensions of the handheld original unit, expanding the interaction possibilities.

BRIEF DESCRIPTION OF THE DRAWINGS

The objectives and advantages of the disclosure will become apparent from the following detailed description of non-limiting figures, wherein:

FIG. 2 shows a table containing screen orientations and display area for display.

DETAILED DESCRIPTION

Figure 1:
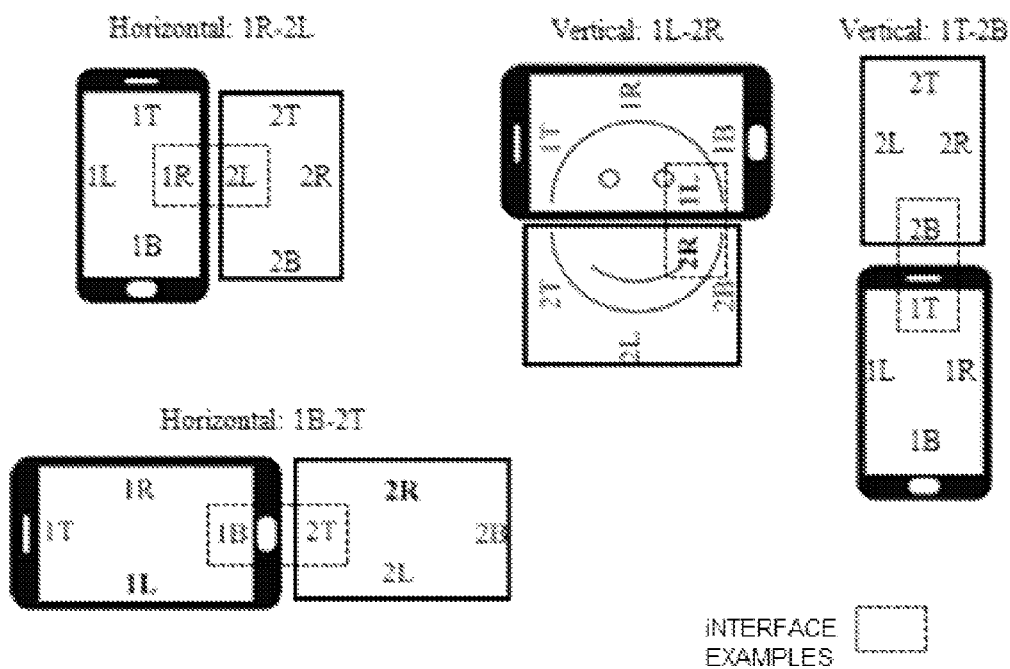
FIG. 1 shows examples of the alignment side of the screen and interfaces.

Reference will now be made in detail to the embodiments, examples of which are illustrated in the accompanying drawings, wherein like reference numerals refer to the like elements throughout. The embodiments are described below to explain the present disclosure by referring to the figures.

According to the embodiment, unless otherwise expressly understood from the particular context, the following terms and definitions apply:

Screen: two-dimensional surface for displaying images or multimedia consisting of a matrix of points ("pixels"), usually implemented in LED or liquid crystal and can be a touch screen.

Primary screen: Main screen embedded, associated with the "master" system that manages image memory (or image-"Buffer"). The assignment as primary screen can be done through the user's selection.

Secondary screen: "slave" screen, which can be embedded in a mobile system as a separate or detachable part of the primary system.

Image Buffer: memory area in which the elements are mapped in screen pixels in a virtual image representation of a rectangular extended screen (Primary and secondary screens).

Contact interface: a unique combination of one side of the primary screen and other side of the secondary screen, encoded, for example, 1R and -2L (interface between the primary right side and the secondary left side).

Functionalities

The secondary screens should be able to communicate with the primary system in order to keep its internal image buffer updated and inform the primary system on user actions.

Both primary and secondary screen should have each side (top, bottom, left, right) uniquely identified.

Upon notification of change of position to be informed on the contact side, the new setting is retained even if screens are separated. In an event of change of orientation of the main system, while not in contact with the secondary screen, the secondary screen should be disabled and image buffer reduced to the original display area only.

Based on the orientation of the screen of the main device and contact interface detected, the main device must:

For the primary screen: keep the same orientation and determine which portion of the buffer of the image extended the primary screen should display.

For the secondary screen: determine which should be the new orientation of the secondary screen and which portion of the buffer of the extended image the secondary screen should display:

Horizontal alignment: left or right portion of the buffer of the extended image.

Vertical alignment: top or bottom area of the buffer of the extended Image.

The combined area of the screen that may vary according to:

a) The alignments of the screen, as shown in FIGS. 1A, 1B, 1C, and 1D:
Landscape with vertical alignment (FIG. 1C)
Landscape with horizontal alignment (FIG. 1B)
Portrait with horizontal alignment (FIG. 1A)
Portrait with vertical alignment (FIG. 1D)

b) The screen orientations:
Portrait at 0 degree.
Portrait at 180 degrees
Landscape at 90 degrees
Landscape at 270 degrees The management system and method presented herein is responsible for defining the exact image that the Primary and secondary screens should display to properly compose an extended rectangular screen or in shapes usually developed for user interaction devices.

Figure 2:
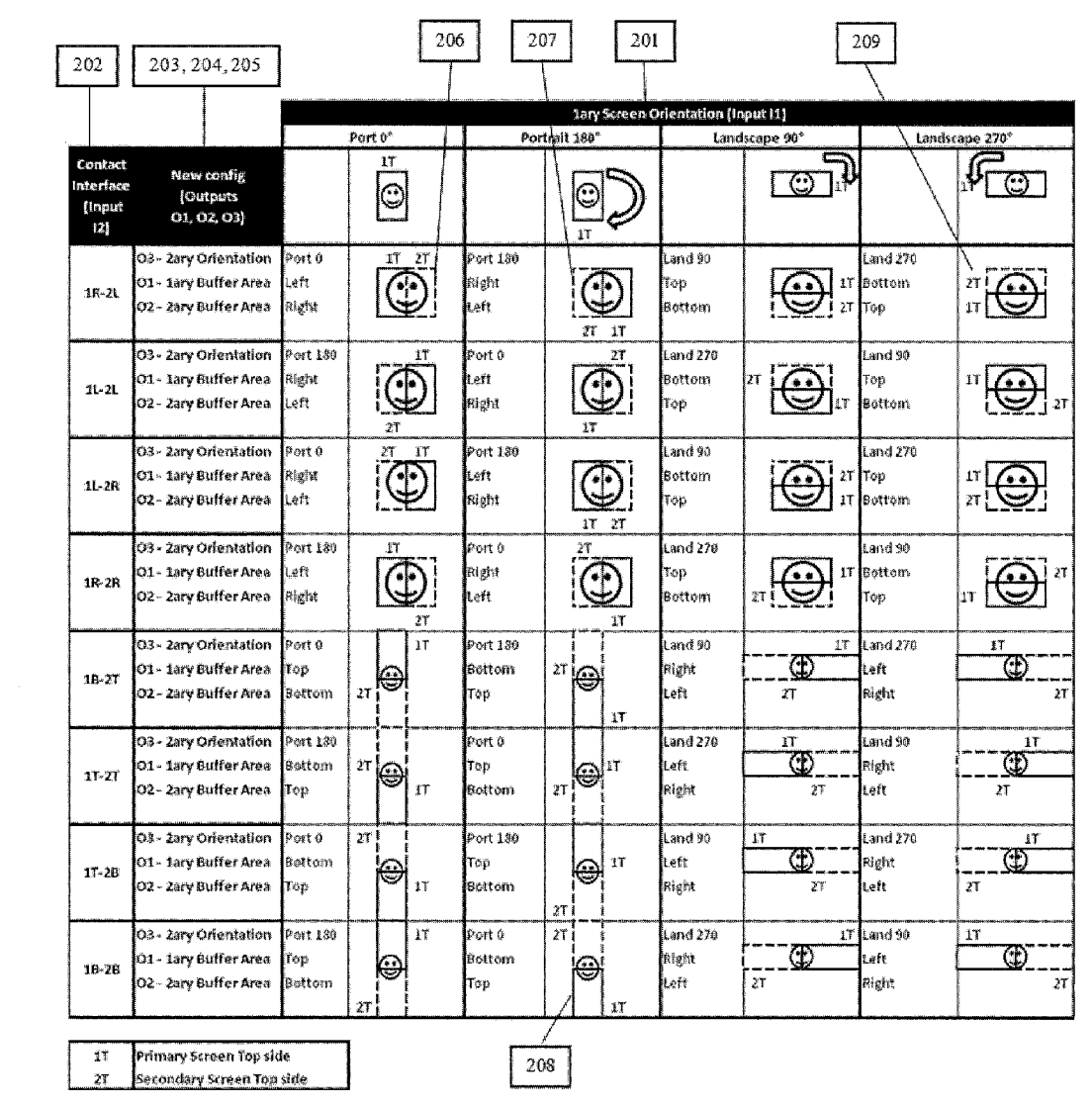

FIG. 2 describes the management method in a tabular format: based on inputs I1 (201) and I2 (202), the outputs O1 (203), O2 (204), and O3 (205) define each possible configuration of the compound screen (206). It should be noted that "1T" and "2T" (209) indicate the top of the primary and secondary screens, respectively.

These are the two entries defined in the table in FIG. 2:

I1) Orientation of primary screen (0, 90, 180, 270 degrees), represented in the columns of the table (201).

I2) The Contact Interface detected by the primary system (1R, 2L, 1L, 2L, etc.), represented in table rows (202). There are eight possible Contact Interfaces:

1. 1R-2L: right side of the primary screen contacts with the left side of the secondary screen.
2. 1L-2L: left side of the primary screen contacts with the left side of the secondary screen.
3. 1L-2R: left side of the primary screen contacts with the right side of the secondary screen.
4. 1R-2R: right side of the primary screen contacts with the right side of the secondary screen.
5. 1B-2T: bottom of the primary screen contacts with the upper portion of the secondary screen.
6. 1T-2T: upper primary screen contacts with the upper portion of the secondary screen.
7. 1T-2B: upper portion primary screen contacts with the bottom of the secondary screen.
8. 1B-2B: bottom of the primary screen contacts with the bottom of the secondary screen.

Based on these two inputs, the following three outputs are determined:

O1) Buffer of primary Image: which portion of the buffer of the extended image will be displayed by the primary display screen (203).

O2) Buffer of Secondary Image: which portion of the Buffer of the extended image will be displayed by the secondary screen (204).

O3) Orientation of the secondary screen (0, 90, 180, 270 degrees) (205).

Based on these inputs of four screen orientations and eight contact interfaces, the result is 32 possible ways of organizing extended image buffer and therefore 32 possible image outputs.

Three examples are described below of how the outputs and hence the contents of the extended image buffer are defined based on the following entries:

1. 206: Whereas the primary screen is in portrait orientation at 0 degrees (I1=primary orientation=0 degrees) and his right face is in contact with the left side of the secondary screen (I2=Contact Interface=1R2L), then, the original image of the primary screen is extended to the right in the image buffer extended in a horizontal alignment. The primary display will keep the same orientation (0 degrees), update its screen with the left portion of the extended image buffer (O1=area of primary image buffer=left) and request the secondary screen to display the right portion of the Buffer of the extended image (O2=Buffer area of the secondary image=right). Finally, the primary display screen will request that Secondary screen rotate the screen to portrait at 0 degrees (O3=secondary screen orientation=0 degrees), in order to adequately represent the buffer of the extended image.

2. 207: Whereas the primary screen in portrait orientation is rotated at 180 degrees (I1=primary screen orientation=180 degrees) and his right face is in contact with the left side of the secondary screen (I2=Interface Contact=1R2L), then, the image of the original primary screen is extended to the left in the buffer of the extended image in a horizontal alignment. The primary display will keep the same orientation (180 degrees), update your screen with the right portion of the area of the buffer of the extended image (O1=area of primary image buffer=right) and requests that the secondary screen displays the left side of the Buffer of the extended image (O2=area Buffer of the secondary image=left). Finally, the primary screen will request the secondary screen to rotate to portrait at 180 degrees (O3=Secondary screen orientation=180 degrees) in order to adequately represent the buffer of the extended image.

3. 208: Whereas the primary screen in portrait orientation rotated at 180 degrees (I1=primary screen orientation=180 degrees) and the lower portion is contacted with the lower portion of the secondary screen (I2=Contact Interface=1B2B), then, the original image of the primary screen is extended to the top portion of the extended image buffer in a vertical alignment. The primary display will maintain the same orientation (180 degrees), update its screen with the bottom of the buffer of the extended image (O1=area of the primary image buffer=Lower Portion) and request the secondary screen to display the top portion of the Buffer area of the extended image (O2=area of the secondary image buffer=upper portion). Finally, the primary screen requests the secondary screen to rotate to portrait at 180 degrees (O3=secondary screen orientation=180 degrees) in order to adequately represent the extended image buffer.

Figure 3:
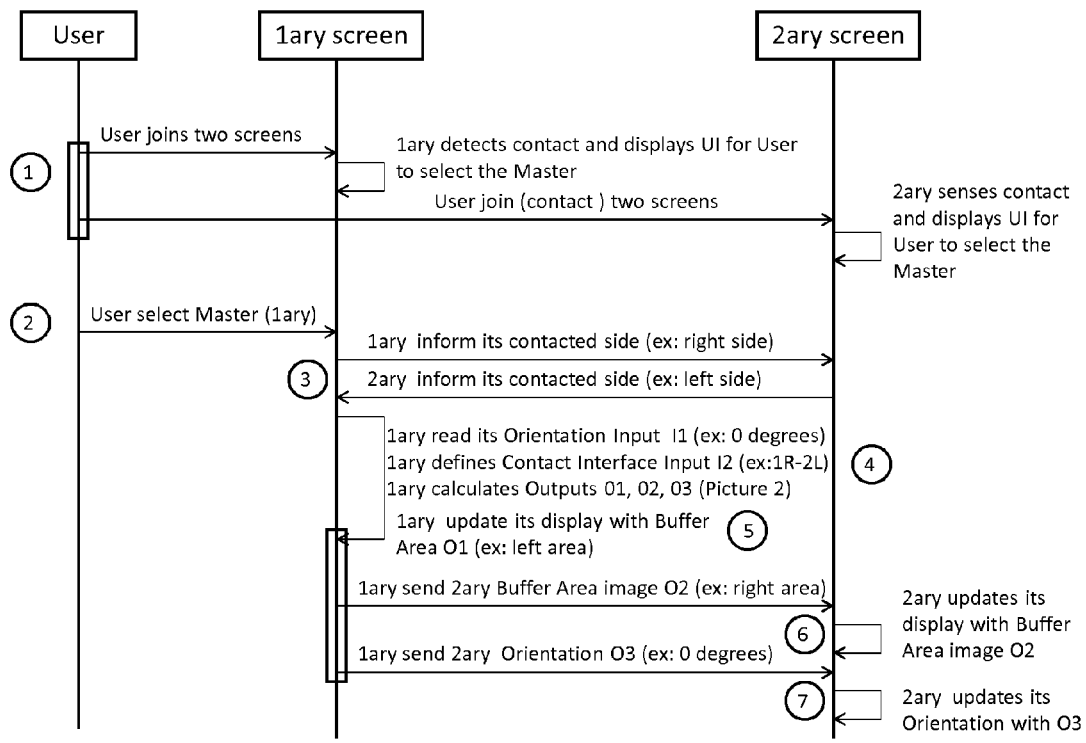
FIGS. 3 and 4 describe the sequence of events between the primary and secondary screen during the management process.
Figure 4:
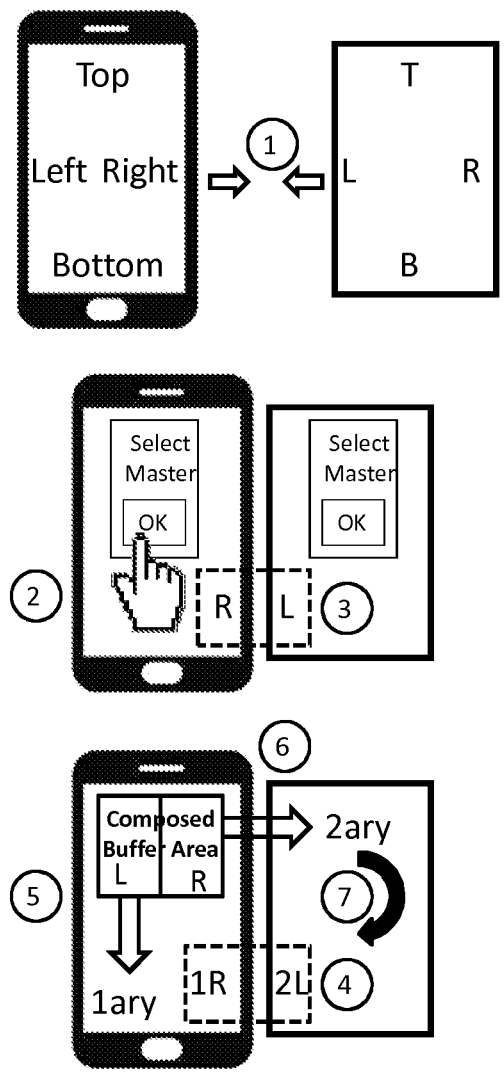

The sequence of operations occurs when the user desires to join at least two devices and the contact is detected by the primary screen and secondary screen, as described in FIGS. 3 and 4.

According to the embodiment herein, it should be noted that the rules defined in the management table of FIG. 2 are applied at operation 4:

Operation 1: After User joining at least two devices or units equipped with screens, each one detects the contact and displays a user interface so that the user can select which of these units will be designated as the primary unit, or Master. If pre-defined, according to the embodiment of the present disclosure, a rule can apply those decisions based on device attributes (pre-set to master, more processing power, higher screen resolution, etc);

Operation 2: The user selects which unit will be assigned as the primary unit, if not pre-defined rule is not employed.

Operation 3: the primary unit and the secondary unit exchange messages with each other containing information about the other contact side.

Operation 4: the primary unit defines the input variables I1 and I2. The primary screen reads its inner orientation value I1—Example of 0 degree. The screen orientation will be the primary orientation to be used in the extended image buffer. The screen defines which was the primary Contact interface id I2—example 1R-2L=right side of the primary screen with the left side of the secondary screen. Having I1 and I2, the primary unit will calculate the outputs O1, O2, O3 using the table defined in FIG. 2.

Operation 5: the primary unit will update its image on the screen based on the output O1—primary Image Buffer—example: the left area. The orientation of the primary screen will be the same as before, but now it will show only part of the extended image.

Operation 6: the primary screen will warn the secondary screen the output O2—secondary image Buffer—example: right area. The secondary unit will then update its image on the screen based on the output O2. If it is just a refresh operation after a user input, it is enough just to inform a "Δ" variation in this message.

Operation 7: a primary screen will inform to the secondary screen the output O3—Secondary Screen Orientation. Based on this, the secondary screen will rotate the screen according to the output O3. After that, the primary and secondary physical screens together compose an extended image that represents the extended image buffer.

The attached figures show an example embodiment in which mobile phones are used. However, as those skilled in the art will readily recognize, it should be noted that representation comprises an example embodiment of the disclosure, and that the system and method of the present disclosure can be implemented in any other user interfaces such as user interfaces.

Moreover, as those skilled in the art will also be able to derive, from the teachings of the present disclosure, the asymmetry relationship or "off half" divisions are possible. Moreover, it should also be noted that the devices of primary and secondary display do not need to be "rectangular" and that this representation is only an example embodiment of the present disclosure.

Although an embodiment of the present disclosure has been shown and described, those skilled in the art will appreciate that various modifications can be made without departing from the scope and spirit of the disclosure as defined in the appended claims.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

It is also expressly stated that all combinations of elements that perform the same function in substantially the same way to achieve the same results are within the scope of the disclosure.

What is claimed is:

1. A method for managing an interaction of screens in at least two devices, which, when combined, expand a display area in different alignments and orientations, the method comprising:

detecting, by the at least two devices, a contact between the at least two devices;

automatically selecting which device of the at least two devices will be designated as a primary device such that the primary device and a secondary device are designated, based on at least one of a processing power, a screen dimension, a screen proportion, a screen resolution, and a predefined user preference of each of the at least two devices;

receiving, by the at least two devices, the designation of the primary device and the secondary device;

exchanging, by the at least two devices, messages with each other containing information regarding the contact between the at least two devices specifying the contact side of each device and the screen orientation of each device;

updating an image on a screen of the primary device to display a partial area of the image in an orientation aligned with the image prior to the detecting the contact between the at least two devices, based on the exchanged information; and updating an image on a screen of the secondary device to display a partial area of the image also in the orientation aligned with the image prior to the detecting the contact between the at least two devices, based on the exchanged information, wherein the screen of the primary device and the screen of the secondary device together display and rotate the images as a compound image on a compound screen.

2. The method of claim 1, wherein the at least two devices include at least one of:
  at least two independent devices each including a screen; and
  at least one device with a built-in primary screen and a detachable secondary screen.

3. The method of claim 1, wherein the at least two devices have at least one of different physical dimensions and image resolutions, or have at least one of the same physical dimensions and image resolutions.

4. The method of claim 1, wherein the contact is detected using sensors positioned on the sides of each of the at least two devices, wherein the sensors are responsible for identifying which side among a left, right, top, and bottom side of the primary device has contacted which side among a left, right, top, and bottom side of the secondary device.

5. The method of claim 1, wherein, based on an orientation of the primary device and the detected contact between the primary device and the secondary device, the exchanged information includes:
  which portion of the image will be displayed by the screen on the primary device;
  which portion of the image will be displayed by the screen on the secondary device; and
  orientation of the screen on the secondary device.

6. A device to expand a display area in different alignments and orientations, the device comprising:
  a processor;
  a detector configured to detect a contact between at least two devices including the device and a secondary device;
  a selector configured to automatically select, by the processor, which device of the at least two devices will be designated as a primary device such that the primary device and the secondary device are designated, based on at least one of a processing power, a screen dimension, a screen proportion, a screen resolution, and a predefined user preference of each of the at least two devices;
  a receiver configured to receive the designation of the primary device and the secondary device;
  an exchanger configured to exchange messages with the secondary device containing information regarding the contact between the at least two devices specifying the contact side of each device and the screen orientation of each device; and
  an updater configured to update an image on a screen of the primary device to display a partial area of the image in an orientation aligned with the image prior to the detecting the contact between the at least two devices, based on the exchanged information,
  wherein the information exchanged with the secondary device allows the secondary device to update an image on a screen of the secondary device to display a partial area of the image also in the orientation aligned with the image prior to the detecting the contact between the at least two devices, based on the exchanged information, and
  wherein the screen of the primary device and the screen of the secondary device together display and rotate the images as a compound image on a compound screen.

7. The device of claim 6, further comprising at least one sensor including at least one of mechanical, electromagnetic, accelerometer, Near Field Communication (NFC), and Wireless Gigabit Alliance (WiGig) Communication.

8. The device of claim 6, wherein the detector detects the contact by at least one of Near Field Communication (NFC), Wireless Local Area Network (WLAN), Wireless Gigabit Alliance (WiGig) Communication, and accelerometers.

9. The device of claim 6, wherein the at least devices include:
  at least two independent devices; and
  at least one device with a built-in primary screen and a detachable secondary screen.

10. A non-transitory computer-readable recording medium storing a program to implement the method of claim 1.

* * * * *